United States Patent [19]

Pate

[11] 4,290,572
[45] Sep. 22, 1981

[54] PIPE CLAMP DEVICE
[75] Inventor: Harold T. Pate, Solon, Ohio
[73] Assignee: Indian Head Inc., New York, N.Y.
[21] Appl. No.: 141,419
[22] Filed: Apr. 18, 1980

Related U.S. Application Data

[63] Continuation-in-part of Ser. No. 970,482, Dec. 18, 1978, Pat. No. 4,225,103.

[51] Int. Cl.³ .............................................. F16H 3/08
[52] U.S. Cl. .................................... 248/74 B; 24/339
[58] Field of Search ..................... 248/73, 74 R, 74 A, 248/74 B, 74 PB, 62, 56, 68 R; 24/73 PB, 16 R; 138/106, 107

[56] References Cited

U.S. PATENT DOCUMENTS

| | | | |
|---|---|---|---|
| 2,099,756 | 11/1937 | Seigle | 138/106 X |
| 2,366,456 | 1/1945 | Pheazey | 248/316 D |
| 3,244,388 | 4/1966 | Coffman | 138/107 X |
| 3,275,274 | 9/1966 | Hutcheon | 248/73 X |
| 3,370,815 | 2/1968 | Opperthauser | 138/106 X |
| 3,532,311 | 10/1970 | Havener | 248/62 |
| 3,547,385 | 12/1970 | Kindorf | 248/62 |
| 3,650,499 | 3/1972 | Biggane | 248/74 R X |
| 3,684,220 | 8/1972 | Logsdon | 248/56 |
| 3,684,223 | 8/1972 | Logsdon | 248/74 PB |
| 3,848,840 | 11/1974 | Umezu | 248/74 PB X |

FOREIGN PATENT DOCUMENTS 1108526 6/1961 Fed. Rep. of Germany ...... 138/106

Primary Examiner—J. Franklin Foss
Attorney, Agent, or Firm—William R. Laney

[57] ABSTRACT

A clamp for suspending a pipe from a strut, the clamp including an elongated flexible strap carrying pipe spacing protuberances on one side, and having tee subassemblies at opposite ends. Each of the tee subassemblies includes a cross-arm which defines a tool-receiving slot aligned with a neck portion of the respective tee subassembly. Each cross-arm carries channel engaging lugs at the opposite ends thereof. The clamp is used in combination with a strut channel having an open mouth and reverse turned edges at opposite sides of the open mouth.

7 Claims, 7 Drawing Figures

PIPE CLAMP DEVICE

RELATED APPLICATIONS

This application constitutes a continuation-in-part of United States Patent application Ser. No. 970,482 entitled "Pipe Clamp Device" filed on Dec. 18, 1978 now U.S. Pat. No. 4,225,103.

BACKGROUND OF THE INVENTION

1. Field of the Invention

This invention relates to pipe clamping devices used for mounting or supporting tubular elements, such as conduit or pipe, on a supporting structure, such as a wall or ceiling, and more particularly, to pipe clamping devices which can be used for quickly hanging or suspending a pipe from a channel strut secured to a supporting structural element.

2. Brief Description of the Prior Art

Various clamp devices have been heretofore proposed for supporting a pipe or other tubular member from a wall, ceiling or some type of stationary fixture. It is desirable with such devices to prevent contact between the pipe or tubular element and the wall, ceiling or other supporting structure, thereby minimizing heat transfer to these structures and, in some instances, avoiding electrolysis by reason of direct contact of dissimilar metals. Such clamp device often take the form of jaws which totally or partially encircle the pipe, and provide flanges of some configuration which can be nailed or in other ways secured to the stationary supporting structure to support the pipe therefrom. Examples of pipe clamps of the type described are those shown in Logsdon U.S. Pat. No. 3,684,223, Logsdon U.S. Pat. No. 3,684,220 and those clamps which are currently manufactured and sold by the Specialty Products Company as illustrated in the brochure filed concurrently with U.S. application Ser. No. 970,482 and representing, with the Logsdon patents, that prior art which is the closest to the present invention now known to me.

In some instances, a pipe clamp is constructed to permit it to be suspended from an open mouth strut or channel bar, and to prevent contact between the pipe and the strut or channel bar. Where this construction is employed, tabs or flanges are used to extend through the open mouth of the channel bar and engage inturned toes or edges carried adjacent this open mouth and thereby hang the clamp from within the strut or channel bar. A strut clamp of this type is marketed by the Specialty Products Company, and is illustrated in the brochure of that company filed concurrently with copending application Ser. No. 970,482.

BRIEF DESCRIPTION OF THE PRESENT INVENTION

The present invention provides a clamp which can be utilized to quickly locate and suspend or mount a pipe or other tubular element from an open-mouthed, channel-type strut, either manually and with no tools, or using only hand tools to place the clamp in engagement with the strut, and to locate the pipe within the clamp.

Broadly described, the pipe clamp of the invention comprises an elongated, flexible strap having pipe spacing protuberances on at least one side of the strap and spaced from each other along the central portion of its length; a transverse stop flange secured to each of the opposite ends of the strap and each extending substantially normal to the longitudinal axis of the strap; and a tee element connected to each of said stop flanges at opposite ends of the strap and projecting from the stop flange on the opposite side thereof from the side of the respective stop flange which is joined to the strap. Each of the tee elements includes a flexible and resilient neck portion and a crossarm element. At least one of the crossarm elements includes and defines a tool-engaging slot aligned with the neck portion of the respective tee element carrying such tool-engaging slot, whereby the tee element carrying the tool-engaging slot can be twisted on its neck portion relative to the projected longitudinal axis of the strap. This can be accomplished with a hand tool, or in some cases, manually, at the option of the installer.

The invention further contemplates a combination which includes the pipe clamp of the invention and a channel-type strut. The strut includes an elongated, generally C-shaped body having an open mouth at one side thereof, and having a pair of reverse turned edges at opposite sides of the open mouth. The clamp is engaged with the described strut by projection of the reverse turned edges o the strut into spaces provided between the crossarm elements of the two tee elements located at opposite ends of the clamp strap, and the stop flanges secured to the opposite ends of the clamp strap.

At the opposite ends of the crossarm element of each tee element, a locking tab is provided to aid in retaining the tee elements engaged with a strut in the manner described, and prevents the clamp from being easily removed from the strut after installation.

An important object of the invention is to provide a simply configured and constructed pipe clamp which can be used for stably and firmly holding and supporting an elongated pipe or other conduit by attachment of the clamp to an elongated strut secured to a wall, ceiling or other structural member.

A further object of the invention is to provide a strut engaging strap type clamp which can be very quickly installed at any place along a channel-type strut mounted stationarily on a supporting structure in a way which permits a pipe to be held by the clamp in juxtaposition to the strut without sagging or displacement of the pipe.

Another object of the invention is to provide a pipe clamp which can be used for clamping a pipe in a suspended position from a strut, effecting the clamping of the pipe in the pipe clamp with or without the use of simple hand tools.

A further object of the invention is to provide a pipe clamp which can be used for suspending a pipe or other tubular member from a stationary strut of channel configuration, with the pipe, when so suspended, being thermally insulated from contact with the strut or any other structural element, and providing for maximum ventilation between the pipe and the clamp, and minimum thermal transfer between the pipe and the clamp.

Additional objects and advantages of the invention will become apparent as the following detailed description of preferred embodiments of the invention is read in conjunction with the accompanying drawings which illustrate such preferred embodiments.

GENERAL DESCRIPTION OF THE DRAWINGS

DETAILED DESCRIPTION OF PREFERRED EMBODIMENTS OF THE INVENTION

Figure 1:
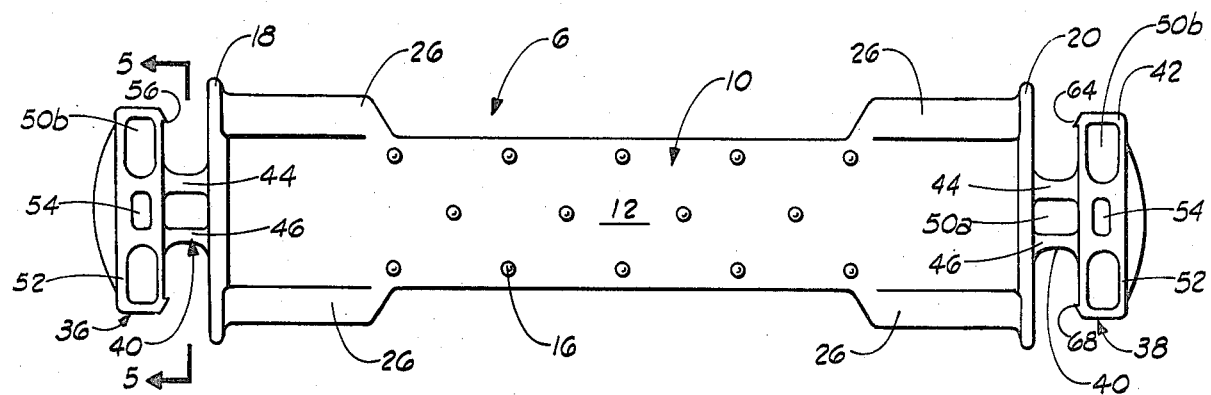
FIG. 1 is a plan view of a pipe clamp constructed in accordance with the present invention.

The pipe clamp 8 of the invention includes an elongated, flexible strap 10 of rectangular configuration and including a first side 12 and a second side 14. The strap includes parallel side edges defining the first and second sides. The first side 12 has a plurality of pipe spacing protuberances 16 formed thereon at spaced intervals and over a major portion of its length. At its opposite ends, the elongated strap 10 is secured to a pair of transversely extending, substantially rectangular stop flanges 18 and 20. A pair of spaced arcuate web portions 19 are disposed at each of the opposite ends of the strap member 10 and project between the surface 12 of the strap member and one side of the respective stop flanges 18 and 20. The arcuate web portions 19 define gussets having an edge formed on an arc of a circle. Each web portion has a lower edge secured to a flair plate 26 which extends in coplanar alignment with the central portion of strap member 10 and is joined to the lower edge of the adjacent respective stop flange 18 or 20.

Secured to the opposite side of the stop flange 18 from that side which is joined to one end of the elongated strap 10 is a tee subassembly designated generally by reference numeral 36. A similar tee subassembly 38 is secured to the stop flange 20 on the opposite side thereof from the side which is joined to one end of the strap 10. In the illustrated embodiment of the invention, the tee subassemblies 36 and 38 are substantially identically constructed, and each includes a flexible, resilient neck portion 40 and an elongated crossarm element 42.

Figure 4:
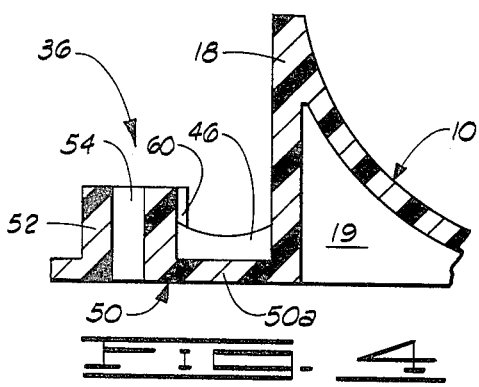
FIG. 4 is a sectional view taken along line 4—4 of FIG. 3.
Figure 5:
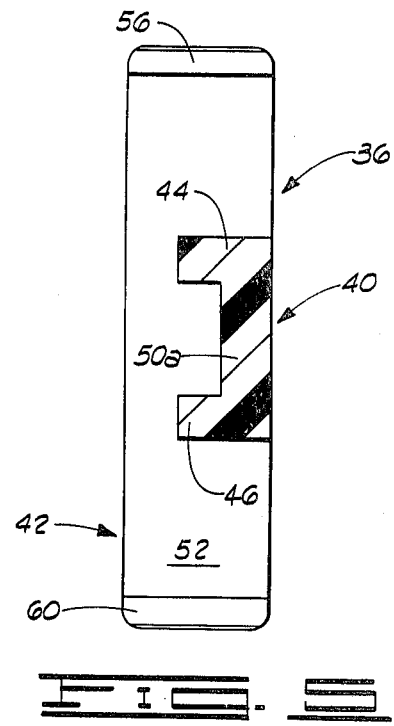
FIG. 5 is a sectional view taken along line 5—5 of FIG. 1.

Each neck portion 40 includes a pair of lateral flanges 44 and 46 which are secured to opposite side edges of a neck extension 50a of a central plate 50. The central plate 50 further includes a crossarm portion 50b which lies within a peripheral flange 52 which peripherally borders or lies at the outer side of the crossarm element 42 of the respective tee subassembly 36 or 38. At a central location in line with the neck extension 50a of the central plate 50, and in alignment with the longitudinal axis of the strap member 10, the crossarm portion 50b of the central plate 50 is slotted and defines with the peripheral flange 52, the slot 54 extending through the crossarm element 42 at this location (see FIGS. 1 and 4).

Figure 2:
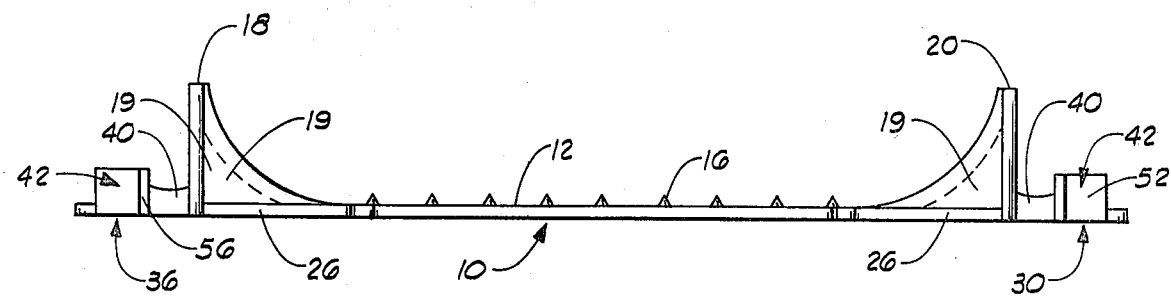
FIG. 2 is a side elevation view of the pipe clamp shown in FIG. 1.
Figure 3:
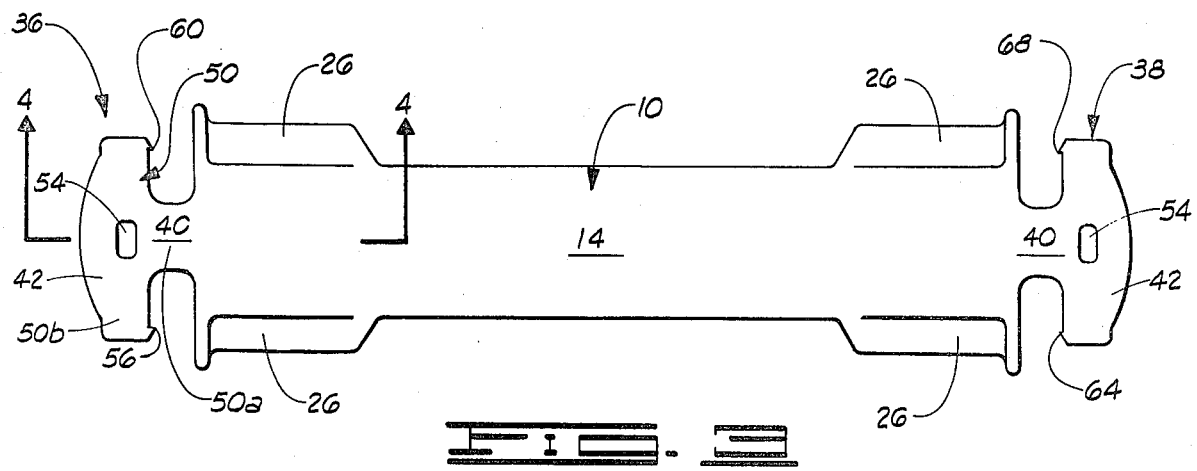
FIG. 3 is a bottom plan view of the pipe clamp shown in FIG. 1.
Figure 6:
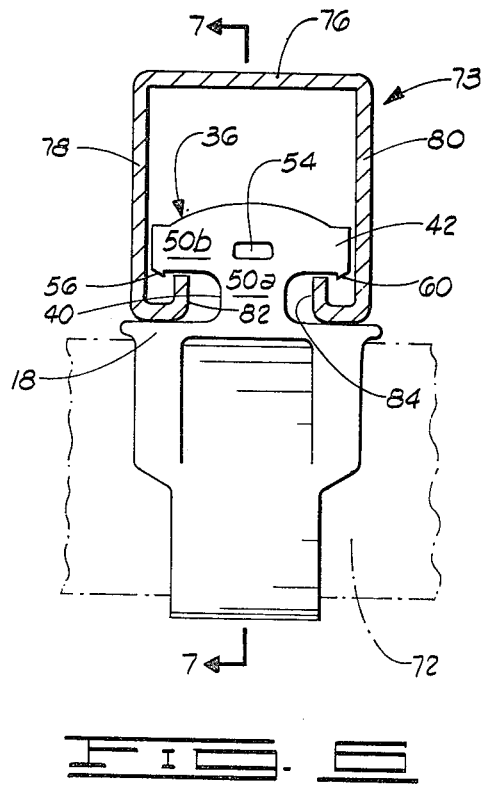
FIG. 6 is a side elevation view of the pipe clamp of the invention mounted in a stationary strut (illustrated in section), and illustrating in dashed lines a pipe or conduit extending through, and engaged by, the clamp.

It will be noted in referring to the drawings that the crossarm elements 42 are substantially rectangular in shape and are spaced by the respective neck portions 40 from the respective stop flanges 18 and 20. The crossarm elements 42 are further characterized in including a pair of locking tabs disposed on the opposite ends thereof. Thus, as shown in FIGS. 2, 3 and 6, the crossarm element 42 of the tee subassembly 36 includes locking tab 56 on one end thereof, and a second locking tab 60 on the opposite end thereof. Similarly, the crossarm element 42 of the tee subassembly 38 includes a locking tab 64 on one end thereof, and a locking tab 68 on the opposite end thereof.

Figure 7:
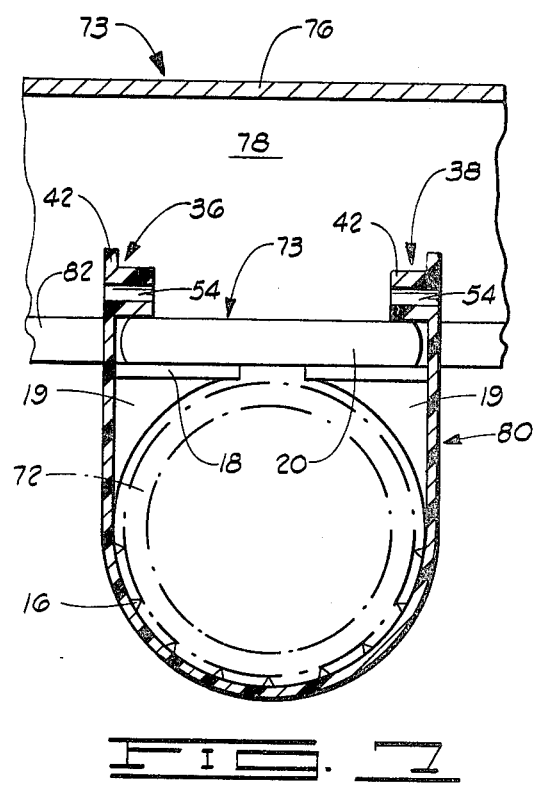
FIG. 7 is a sectional view of the pipe clamp of the invention, and further illustrating in dashed lines the position of a pipe within the pipe clamp at a time when the pipe is engaged in the position in which it is located when the clamp is used to support the pipe from a stationary strut.

The manner in which the pipe clamp device of the invention is utilized for supporting a pipe from an elongated strut or channe bar is best illustrated in FIGS. 6 and 7 of the drawings. The clamp device 8 is shown in use for encircling and engaging a pipe or conduit 72. It will be understood that the strap 10 is made of a flexible material, and that the neck portions 40 forming portions of the tee subassemblies 36 and 38 are made of a flexible and resilient material, all as hereinbefore described. Preferably, the entire clamp device is molded from a suitable synthetic resin, having good tensile strength and aging characteristics.

In use, the clamp device retains the pipe 72 within an encircling and confining structure formed by the strap 10 and the pipe spacing protuberances 16. It will be noted that in the pipe engaging status, the strap 10 is flexed so that it is bent through an angle of 180° as defined by its longitudinal axis. The tee subassemblies 36 and 38 are then positioned for engagement with a strut or channel bar.

When the clamp device is to be engaged with the strut or channel bar, it is positioned in the manner shown in FIG. 6. In that figure of the drawings, an elongated strut or channel bar is shown in section and is denominated by reference numeral 73. The strut includes a web 76 having a pair of substantially parallel legs 78 and 80 secured to the side edges of the web. The legs 78 and 80 are terminated in in-turned edge portions 82 and 84 which define an opening to the interior of the strut 74. The strut 74 is normally secured to a ceiling or wall so that the opening to the interior generally faces downwardly or outwardly. In some installations, however, the pipe may rest upon the strut. In these cases, the clamp functions to align the pipe with the strut and adjacent piping runs to provide adequate spacing, and to hold the conduit off the strut surface.

In order to mount the clamp device 8 of the present invention in the strut 74, one of the tee subassemblies 36 or 38 is initially placed within the interior of the strut by first aligning the crossarm element 42 thereof with the opening between the in-turned edge portions 82 and 84 so that the crossarm element can pass freely to the interior of the strut. At a time when the stop flange 18 or 20, associated with the respective tee subassembly 36 or 38 which is placed within the interior of the strut, has been brought to bear against the convex outer and lower sides of the in-turned edge portions 82 and 84, the entire clamp device 8 is rotated about the longitudinal axis of the strap 12 so that the crossarm element 42 within the strut is brought into a transverse position as illustrated in FIG. 7. In assuming this position, the locking tabs 56 and 60 snap over the in-turned edge portions 82 of the strut legs 78 and 80 and aid in moving the crossarm element 42 inside the strut 74 into a position where it bridges across and rests upon the in-turned edge portions 82 and 84. These edge portions are thus clamped firmly between the crossarm element 42 inside the strut and the respective stop flange 18 or 20 (the stop flange 18 is that which is illustrated in FIG. 6).

After insertion of one of the tee subassemblies 36 and 38 into the interior of the strut 74 in the manner described, and reorientation of the clamp device 8 so that the crossarm element 42 of the tee subassembly 36 extends transversely with respect to the longitudinal axis of the strut, the elongated flexible strap 10 is then wrapped about the periphery of the pipe 72 which is to be clamped within the clamp device and suspended from the strut.

When the strap 10 is wrapped about the pipe 72 in the manner described, the pipe spacing protuberances 16 contact the outer periphery of the pipe in the manner illustrated in FIG. 7. With the pipe 72 encircled by the strap 10 in this fashion, the second of the tee subassemblies 38 is then placed on the interior of the strut 74 by twisting the crossarm element 42 of this tee subassembly upon the neck portion thereof. This is accomplished by inserting the point of a screwdriver or similar implement in the slot 54, and using the shaft of the screwdriver to provide the leverage necessary to twist the crossarm element 42 on the flexible and resilient neck portion 40. The crossarm element 42 is thus twisted to a location where it is then in a plane permitting it to pass through an opening between the in-turned edge portions 82 and 84 and up into the interior of the strut 74. The screwdriver or other implement can then be used to push the crossarm element 42 through the opening between the in-turned edges 82 and 84 and into the interior of the strut.

Once the cross-arm element 42 is in this location, the screwdriver can be withdrawn to permit the crossarm element to pivot back to its relaxed status in which it extends transversely with respect to the longitudinal axis of the strut 74. At this time, the clamp device 8 appears as shown in FIGS. 6 and 7 with the crossarm elements 42 of the two tee subassemblies 36 and 38 aligned in parallel and extending transversely across the strut in contact with the in-turned edge portions 82 and 84. Both of the stop flanges 18 and 20 located at opposite ends of the flexible strap 10 bear against the lower sides of the in-turned edge portions 82 and 84 to help retain the clamp device in the selected location along the strut 74, and to prevent swiveling or pivoting action of the clamp within the strut. On some occasions, the clamp will be connected to the strut by inserting both crossarm elements 42 in the strut before the pipe is inserted into the encircling strap of the clamp as thus mounted. In this type of installation, no tools are needed.

From the foregoing description of the invention, it will be perceived that the present invention provides an improved clamp device which can be used for clamping a pipe or conduit and suspending such clamped pipe or conduit from an open-mouthed strut or channel bar. It will also be seen that, as shown in FIGS. 6 and 7, the clamp device of the invention totally isolates the conduit or pipe from contact with the channel bar, which may often be made of metal, and assures ventilation around the pipe or channel bar at the point where it passes through the clamp device.

Although a preferred embodiment of the invention has been illustrated in the drawings and has been herein described, it will be understood that various changes and innovations in the illustrated structure can be effected without departure from the basic principles which underlie this invention. Changes and innovations of this type are therefore deemed to be circumscribed by the spirit and scope of the invention, except as the same may be necessarily limited by the appended claims or reasonable equivalents thereof.

What is claimed is:

1. A pipe clamp device comprising:
    an elongated flexible strap having a first side, a second side, a pair of opposed side edges, and a pair of opposite ends;
    a pair of stop flanges each having one side secured to one of said ends of said strap and extending transversely across the strap;
    a pair of tee subassemblies each connected to one of said stop flanges on the opposite side thereof from said strap, and each including:
        a crossarm element having a tool-receiving slot therethrough in alignment with the longitudinal axis of said elongated strap for facilitating the twisting of said crossarm element about the longitudinal axis with a leverage tool inserted into said slot;
        a flexible, resilient neck portion interconnecting the crossarm element with the respective adjacent one of said stop flanges; and
        a locking tab projecting from each of the opposite ends of said crossarm elements toward said adjacent one of said stop flanges.

2. A pipe clamp device as defined in claim 1 and further characterized as including a plurality of pipe spacing protuberances secured to, and projecting from, said first side of said strap.

3. A pipe clamp device as defined in claim 1 wherein each of said stop flanges is substantially rectangular in configuration and extends in a plane substantially normal to the main plane of said strap.

4. A pipe clamp device as defined in claim 3 and further characterized as including web portions adjacent opposite ends of the strap, and each extending between said first side of the strap and one side of one of said stop flanges in a plane extending normal to the plane of said one stop flange.

5. A pipe clamp device as defined in claim 1 wherein said neck portion comprises:
    a pair of substantially parallel lateral flanges; and
    plate means interconnecting said lateral flanges.

6. A pipe clamp device as defined in claim 5 wherein said crossarm element comprises:
    a peripheral flange portion connected to said lateral flanges; and
    plate means connected to the plate means of said neck portion.

7. A pipe clamp device as defined in claim 3 wherein each of said stop flanges defines with an adjacent one of said crossarm elements, a pair of spaces located on opposite sides of one of said neck portions.

* * * * *